United States Patent
Adler

(10) Patent No.: US 6,505,203 B1
(45) Date of Patent: *Jan. 7, 2003

(54) GEOGRAPHICALLY SENSITIVE AUTOMATED NOTICE SYSTEM

(76) Inventor: Robert M. Adler, 400 N. Flagler Dr., D-2, West Palm Beach, FL (US) 33401

( * ) Notice: Subject to any disclaimer, the term of this patent is extended or adjusted under 35 U.S.C. 154(b) by 0 days.

This patent is subject to a terminal disclaimer.

(21) Appl. No.: 09/565,830

(22) Filed: May 5, 2000

Related U.S. Application Data

(63) Continuation-in-part of application No. 09/400,036, filed on Sep. 21, 1999.

(51) Int. Cl.7 .............................................. G06F 17/30
(52) U.S. Cl. ............................................. 707/10; 707/7
(58) Field of Search ........................ 707/10, 6, 7, 200, 707/104, 202; 340/573.3; 379/67.1; 40/300; 342/357.07

(56) References Cited

U.S. PATENT DOCUMENTS 6,067,018 A * 5/2000 Skelton et al. ............ 340/573.3

OTHER PUBLICATIONS

Sherlock Bones, www.sherlockbones.com, pp. 1–7, 1997.*

* cited by examiner

Primary Examiner—Sanjiv Shah
(74) Attorney, Agent, or Firm—McHale & Slavin, P.A.

(57) ABSTRACT

The present invention is a system that utilizes the global computer network ("Internet") to provide an intelligent and powerful notification system for canvassing specific geographical areas in a matter of seconds to aid in the location of a missing person. Utilizing an on-line missing person interview and active web site engine, a photo e-mail can be distributed instantaneously to reach a large segment of the community. The notification system retains information about persons and their guardians/parents, including photographs. Upon notification of the loss of a person, the system will initiate calculations, based upon the last known location, particular abilities and an estimate of how long it has been missing, to determine the most appropriate target area for the search.

7 Claims, 5 Drawing Sheets

Plan 1. We have canvassed this 10 sq. mile geographic area:

Please leave your phone lines open.

Click here to receive important instructions for what to do now!

Search is now underway!

1,780 Photo E-mails are now being mass distributed to:

16 Police/Fire Departments

37 Veterinarians

6 Humane Societies 1,832 Volunteer Pet Lovers

33 Television / Radio Stations

35 Churches • Synagogues • Temples

21 Schools

If you would like a hard copy of the names, addresses, phone numbers, and emails of where the photo E-mail was sent, Click here

Now click

GEOGRAPHICALLY SENSITIVE AUTOMATED NOTICE SYSTEM

This application is a continuation in part of Ser. No. 09/400,036 filed Sep. 21, 1999, now pending.

FIELD OF THE INVENTION

This invention relates to a geographically sensitive system for noticing lost children and physically or mentally impaired persons by use of a global computer network.

BACKGROUND OF THE INVENTION

The loss of one's personal property, whether by chance or as the result of theft, is often devastating. When the lost item is a living being, for example a child or loved one or pet, the loss is catastrophic. While the loss of a child or adult brings together numerous governmental agencies, e.g. police departments, the FBI, fire departments, etc., there is no instant means to coordinate and disseminate information.

The statistics pertaining missing children, alone, state that there are 2300 children reported missing every day in the United States. This amounts to approximately 839,500 missing children per year.

As the human population both expands and ages, the number of incidents of missing people increases each year. Every day there are reported stories of Alzheimer afflicted adults wandering away from home or becoming lost. Children and mentally impaired individuals are the objects of searches quite regularly. Because of the ability to communicate and higher intensity of the search, in most instances, the recovery of missing persons has a greater success rate than for pets. However, the anxiety level of the responsible adults during the ordeal of a missing person search can produce psychological scars.

The recovery rate is not so high in the incidence of abduction and runaways where the cooperation of the subject is either prevented or not volunteered.

Thus, what is needed is a system that can assist the guardian or parent in the search for a missing person or child.

DESCRIPTION OF THE PRIOR ART

U.S. Pat. No. 4,650,219, incorporated herein by reference, describes a system facilitating the identification of found children so that the guardian or parent may be notified. The identification uses a code or tag carried by the child preventing the child's name from becoming known to the public.

U.S. Pat. No. 5,878,116 is drawn to a method for locating a lost pet, person or object. The method describes use of an identification number contained on a card held by the owner and on a tag attached to the item.

The prior art suffers from an inability to distribute an alert regarding the lost child or impaired person 1) in a timely fashion, and 2) to an appropriate geographical area, to maximize the probability of recovery.

Therefore, if a method for finding a lost child or impaired person could be devised which would alert the appropriate personnel that a particular person was missing in their location, at that instant in time, a long-felt need in the art would be satisfied.

SUMMARY OF THE INVENTION

The present inventor has developed a system which utilizes the technological power provided by the global computer network ("Internet") to provide an intelligent and powerful missing person notification system for canvassing specific geographical areas in a matter of seconds. By use of an on-line interview and active web site engine, a photo e-mail of the missing person can be distributed instantaneously to reach a large segment of the community, including doctors, neighborhood watch societies, police agencies, TV, radio stations, churches, synagogues, and any volunteer groups, such as the Boy Scouts and Girl Scouts, who will help parents and guardians search for missing children or persons in a time of emergency. The notification system has the capability of retaining information about the child or impaired person and their parents or guardian, including photographs. Present technology makes it possible to scale a single system to handle all minors and impaired persons in the United States. Upon notification of that such a person is missing, the system will instantly calculate the geographical location within which the that person is most likely to be present. Using the person's home zip code, the system will initiate calculations, based upon the particular age and ability of the person and an estimate of how long he/she has been missing, to determine the most appropriate target area for the search.

Utilizing high speed distribution of lost photo e-mails, at speeds of about 30,000 per minute; and high speed distribution of emergency phone calls, at speeds of about 10,000 per 15 minutes; the system will utilize the enormous popularity and communicating power of the Global computer network to activate a proactive on-line technology. The system will instantly canvass large geographic areas in seconds, distributing vital information to strategically positioned members of the local community in order to reunite the missing person and his/her parents or guardian. Up to 400 simultaneous requests for registration or emergency searches can be handled by the system. Thousands of caring people will be alerted within minutes of notification that a child or impaired person is lost, enabling the community to come together quickly and galvanize their efforts to locate the lost person.

The present inventor contemplates the use of the system for finding missing persons, both child and adult.

Accordingly, it is an objective of the instant invention to teach a system which utilizes the global computer network to initiate a notification process to help in locating a lost child or impaired person.

It is a further objective of the instant invention to provide a method of operating an interview and active web site engine via the global computer network, which provides speed, scalability, reliability and security.

It is yet another objective of the instant invention to teach a notification system which provides for registration of the child or impaired person online via inclusion of scanned photographs.

It is a still further objective of the invention teach a system which determines an optimum exposure area for distribution of information regarding the lost person based upon input of critical data regarding age and abilities, time lost and last known location.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

In operation a guardian or parent registers their child or impaired charge, either online via the global computer network, or by mail, using a code which includes various identifying information regarding both the person and his/her responsible adult. A photo of the person can be included either by mail or it may be scanned so as to be in a digital format and then forwarded via the global computer network. The system's web site is structured to provide a registration process and a search engine interface. The information is stored within the system server in a computer retrievable format.

The process of the instant invention provides an automated method for coordinating a notification procedure for aiding in locating a missing person via the global computer network comprising the steps of providing a means for submission of identifying data for registration of a particular person; storing said identifying data in a computer retrievable format accessible via the global computer network; developing a database inclusive of public and private institutions and individuals selected to receive notification of missing persons via the global computer network; maintaining said database in a computer retrievable format for access via the global computer network; providing a means for global computer network receipt of notification that a registered person is missing and critical data pertinent thereto; activating an algorithm designed to compute, from said critical pertinent data, a geographical area within which the missing person is projected to have the highest probability of being resident; and providing a mechanism for distribution of an electronic mail alert notification to all of said public and private institutions and individuals within the computed area.

Figure 1:
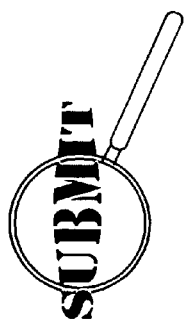
FIG. 1 is an input screen for registration of a person and his/her guardian with the system.

The invention further provides a missing person notification computer for creation of individualized notifications of lost people to be transferred via the global computer network, comprising:

an information submission module executable at said notification computer, said information submission module configured for submission of information relating to a particular person, characterized by identification of said person and specific information relating to the loss thereof; and an automated e-mail distribution module executable at said notification computer, said e-mail distribution module configured to select and distribute e-mail notifications regarding said missing person to public and private institutions and individuals calculated to be resident within a geographical location projected to have the highest probability of containing the lost person. In a particularly preferred embodiment, the system further includes an advertising module executable at an advertisement provider computer, said advertising module configured to select advertisement content from a database of advertisers located within the geographical location projected by said distribution module, and further configured to provide said advertisement in conjunction with said e-mail notifications Now with reference to the accompanying figures, FIG. 1 shows an input screen for entering basic registration information regarding a person and his/her guardian or parent into the system.

Figure 2:
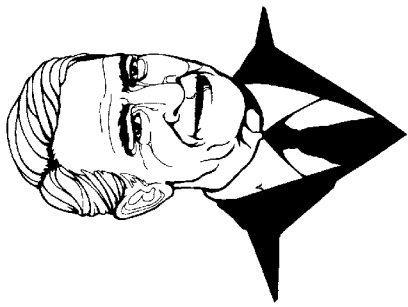
FIG. 2 is an input screen for notification of the system regarding the disappearance of a person.
Figure 3:
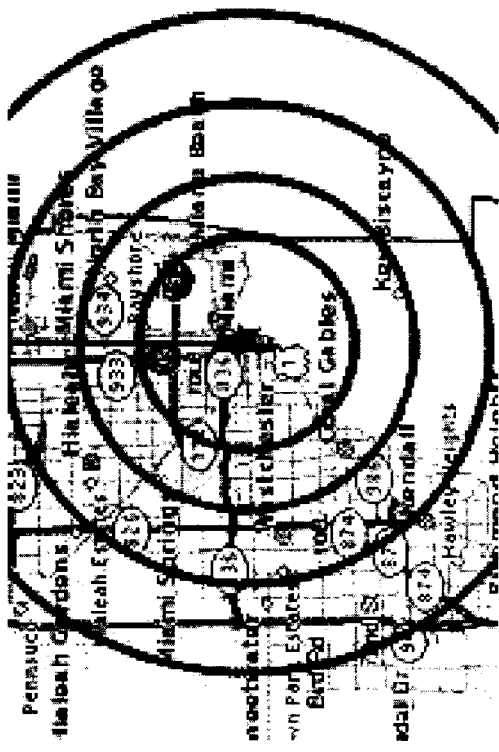
FIG. 3 is a system generated response which alerts the missing person's guardian as to the calculated search area.

Referring to FIG. 2, an input screen for notification of the system regarding the disappearance of a person is shown. Upon determining that a person is missing, a parent or guardian utilizes their computer, or a telephone, to contact the system with pertinent information relating to the missing person and his/her disappearance. It is possible for the responsible adult to include their name, address, telephone number, e-mail address, and a personal message. The guardian or parent can also include information regarding the missing person, including name, age, sex, hair color, eye color, weight, height and additional identifying data, such as birthmarks, race or national origin. As next shown in FIG. 3, utilizing this data, the system can utilize an algorithm designed to calculate the geographical area deemed to have the highest probability of finding the person. A map of the area is generated for the parent, along with instructions as to how to the parent should proceed after a given amount of time.

Figure 4:
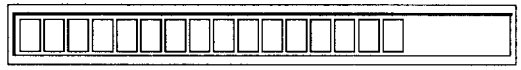
FIG. 4 is a real-time screen which illustrates distribution of the alert through the system.
Figure 4:
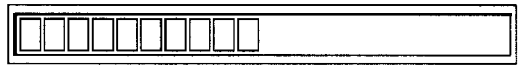
Figure 4:
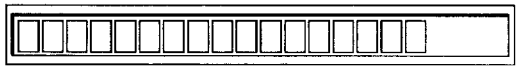
Figure 4:
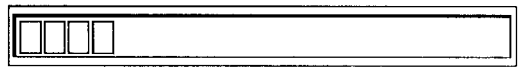
Figure 4:
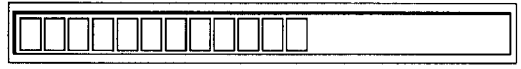
Figure 4:
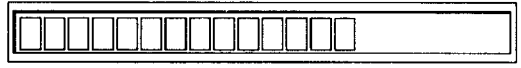
Figure 4:
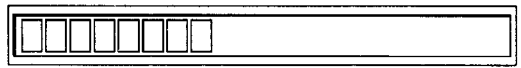
Figure 4:

Referring to FIG. 4, a real-time screen which illustrates distribution of the alert through the system is broadcast to the guardian/parent via the global computer network. This allows them to visualize the progress of the system in distributing the notification of their child's disappearance.

Figure 5:
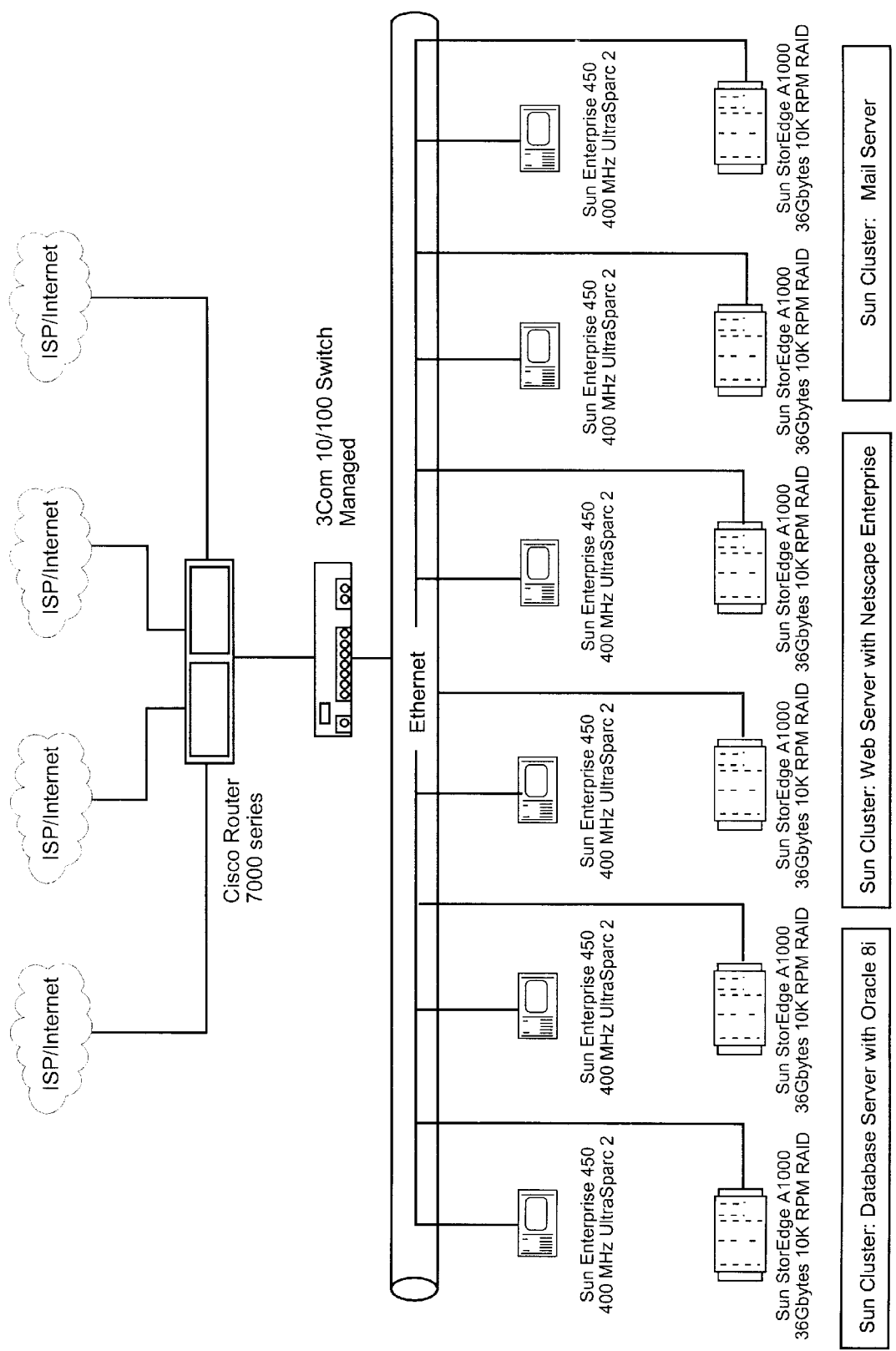
FIG. 5 is an example of the system architecture.

With reference to FIG. 5, a diagram exemplifying the system architecture is shown. The notification system will be divided into four main parts:

1) processing/database system;
2) messaging system;
3) web server; and
4) network/telecom infrastructure. All these parts are off-the-shelf items having the requisite functions. The particular manufacturer and Model is of no import but merely serves as an example.

The database server may rely on two SUN ENTERPRISE 450 servers or equivalents configured to operate as a cluster. ORACLE SERVER EE 8i, coupled with ORACLE PARALLEL SERVER or equivalents will optimize the SUN cluster architecture to provide an optimum database system. Data processing may be handled by ORACLE APPLICATION SERVER ENTERPRISE and ORACLE INTERMEDIA or equivalents.

The messaging system may be based upon a cluster architecture also and may utilize at least two SUN ENTERPRISE 2 Model 1400 servers to support SUN's SENDMAIL messaging server.

Using the same physical architecture as the messaging system, the web server may implement NETSCAPE ENTERPRISE SERVER.

The network/telecom may utilize a device having the capabilities of a CISCO 7500 Series router, particularly preferred is a CISCO 7576. Desirable characteristics are LAN/WAN services support, redundancy, reliability and performance. Scalability is accomplished due to a bandwidth extensible to 4 Gbps. Switching is accomplished via a 3COM SUPERSTACK II Switch 3300 or equivalent.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A method for coordinating a notification procedure for aiding in the locating of a missing person via the global computer network comprising:

providing a means for submission of identifying data for registration of a particular person;

assigning a code to said identifying data;

storing said code and said identifying data in a computer retrievable format accessible via the global computer network;

developing a database inclusive of public and private institutions and individuals selected to receive notification of missing persons via the global computer network;

maintaining said database in a computer retrievable format for access via the global computer network;

providing a means for global computer network receipt of notification that a registered person is missing and critical data pertinent thereto;

activating an algorithm based on time and distance designed to compute, from said critical pertinent data, a geographical area within which the missing person is projected to have the highest probability of being resident; and providing a mechanism for distribution of an electronic mail alert notification to all of said public and private institutions and individuals within said geographical area.

2. The method of claim 1 wherein the critical pertinent data includes the missing person's name, age, weight, hair color, eye color, national origin and period of time that the person has been known to be missing.

3. The method of claim 1 wherein the means for submission is a questionnaire adapted to be completed via the global computer network.

4. The method of claim 1 wherein the method further includes obtaining and attaching a unique identifying tag to the person.

5. A missing person notification computer for creation of individualized notifications of missing persons to be transferred via the global computer network, comprising:

an information submission module executable at said notification computer, said information submission module configured for submission of information relating to a particular person, characterized by identification of said person and specific information relating to the loss thereof; and an automated e-mail distribution module executable at said notification computer, said e-mail distribution module configured to select and distribute e-mail notifications regarding said missing person to public and private institutions and individuals calculated to be resident within a geographical location projected to have the highest probability of containing the missing person.

6. The missing person notification computer in accordance with claim 5, wherein said computer is associated with a website which is comprised of a plurality of computers.

7. The missing person notification computer in accordance with claim 5, further including:

an advertising module executable at an advertisement provider computer, said advertising module configured to select advertisement content from a database of advertisers located within the geographical location projected by said distribution module, and further configured to provide said advertisement in conjunction with said e-mail notifications.

* * * * *